(12) United States Patent
Blumenfeld et al.

(10) Patent No.: US 9,231,950 B2
(45) Date of Patent: *Jan. 5, 2016

(54) OUT-OF-BAND TOKENS FOR RIGHTS ACCESS

(71) Applicant: Time Warner Inc., New York, NY (US)

(72) Inventors: Steven M. Blumenfeld, Lafayette, CA (US); William J. Raduchel, Great Falls, VA (US)

(73) Assignee: Time Warner Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,695

(22) Filed: Nov. 8, 2013

(65) Prior Publication Data

US 2014/0137207 A1    May 15, 2014

Related U.S. Application Data

(63) Continuation of application No. 13/220,418, filed on Aug. 29, 2011, now Pat. No. 8,584,253, which is a continuation of application No. 11/966,428, filed on Dec. 28, 2007, now Pat. No. 8,011,007, which is a continuation of application No. 10/412,682, filed on Apr. 14, 2003, now Pat. No. 7,315,946, which is a continuation-in-part of application No. 10/334,144, filed on Dec. 31, 2002, now abandoned.

(60) Provisional application No. 60/421,051, filed on Oct. 25, 2002.

(51) Int. Cl.
*H04L 29/06* (2006.01)
*G06F 12/14* (2006.01)
*G06F 17/30* (2006.01)
*G06F 21/10* (2013.01)
*G11B 20/00* (2006.01)

(52) U.S. Cl.
CPC ............ *H04L 63/10* (2013.01); *G06F 12/1458* (2013.01); *G06F 17/30017* (2013.01); *G06F 21/10* (2013.01); *G11B 20/0026* (2013.01); *G11B 20/00086* (2013.01); *G11B 20/00253* (2013.01); *G11B 20/00275* (2013.01); *G11B 20/00731* (2013.01); *G11B 20/00876* (2013.01); *G06F 2221/0797* (2013.01); *G06F 2221/2121* (2013.01); *G06F 2221/2153* (2013.01); *G11B 2220/2537* (2013.01)

(58) Field of Classification Search
CPC ...... H04L 63/10; G06F 12/1458; G06F 21/10
See application file for complete search history.

(56) References Cited

U.S. PATENT DOCUMENTS 4,528,588 A * 7/1985 Lofberg .................. G06F 21/16
340/5.1
5,892,900 A    4/1999 Ginter et al.
(Continued)

OTHER PUBLICATIONS

"C.O.B.A.S. Centralized Out-of-Band Authentication System," Sep. 8-9, 2003, QT Worldtel Inc., Southeast Europe Cybersecurity Conference, p. 1-14.
(Continued)

*Primary Examiner* — Harunur Rashid
*Assistant Examiner* — Shahriar Zarrineh
(74) *Attorney, Agent, or Firm* — Fish & Richardson P.C.

(57) ABSTRACT

Access to content may be administered by storing content, the content comprising one or more selections, accessing a passive optical out-of-band token associated with the content, determining an access right for the content based on the passive optical out-of-band token, and enabling access to the content in accordance with the access right.

18 Claims, 8 Drawing Sheets

(56) References Cited

U.S. PATENT DOCUMENTS

| | | | |
|---|---|---|---|
| 5,898,830 A | 4/1999 | Wesinger et al. | |
| 6,052,788 A | 4/2000 | Wesinger et al. | |
| 6,236,971 B1 | 5/2001 | Stefik et al. | |
| 6,301,660 B1 | 10/2001 | Benson | |
| 6,314,409 B2 | 11/2001 | Schneck et al. | |
| 6,314,518 B1* | 11/2001 | Linnartz | G06T 1/0085 375/E7.001 |
| 6,330,549 B1 | 12/2001 | Merkle | |
| 6,351,813 B1 | 2/2002 | Mooney et al. | |
| 6,385,729 B1 | 5/2002 | DiGiorgio et al. | |
| 6,434,535 B1 | 8/2002 | Kupka et al. | |
| 6,503,147 B1 | 1/2003 | Stockdale et al. | |
| 6,513,121 B1 | 1/2003 | Serkowski | |
| 6,519,700 B1 | 2/2003 | Ram et al. | |
| 6,523,119 B2 | 2/2003 | Pavlin et al. | |
| 6,542,358 B1 | 4/2003 | Kunz et al. | |
| 6,547,146 B1 | 4/2003 | Meksavan et al. | |
| 6,550,011 B1 | 4/2003 | Sims, III | |
| 6,557,104 B2 | 4/2003 | Vu et al. | |
| 6,567,794 B1 | 5/2003 | Cordery et al. | |
| 6,577,561 B2 | 6/2003 | Pirot et al. | |
| 6,606,707 B1 | 8/2003 | Hirota et al. | |
| 6,651,169 B1 | 11/2003 | Benson et al. | |
| 6,651,175 B1 | 11/2003 | Slama | |
| 6,658,000 B1 | 12/2003 | Raciborski et al. | |
| 6,658,585 B1 | 12/2003 | Levi | |
| 6,658,586 B1 | 12/2003 | Levi | |
| 6,662,228 B1 | 12/2003 | Limsico | |
| 6,665,799 B1 | 12/2003 | Slama | |
| 6,671,808 B1 | 12/2003 | Abbott et al. | |
| 6,674,259 B1 | 1/2004 | Norman et al. | |
| 6,678,665 B1 | 1/2004 | Benson et al. | |
| 6,708,157 B2 | 3/2004 | Stefik et al. | |
| 6,714,921 B2 | 3/2004 | Stefik et al. | |
| 6,751,738 B2 | 6/2004 | Wesinger et al. | |
| 6,804,783 B1 | 10/2004 | Wesinger et al. | |
| 7,028,336 B2 | 4/2006 | Wesinger et al. | |
| 7,031,301 B1 | 4/2006 | Oz et al. | |
| 7,191,153 B1 | 3/2007 | Braitberg et al. | |
| 7,249,378 B2 | 7/2007 | Wesinger et al. | |
| 7,315,946 B1 | 1/2008 | Blumenfeld et al. | |
| 7,373,658 B1 | 5/2008 | Blumenfeld et al. | |
| 7,647,277 B1 | 1/2010 | Blumenfeld et al. | |
| 8,011,007 B2 | 8/2011 | Blumenfeld et al. | |
| 8,584,253 B2 | 11/2013 | Blumenfeld et al. | |
| 2001/0025269 A1 | 9/2001 | Otsuka | |
| 2002/0043557 A1 | 4/2002 | Mizoguchi et al. | |
| 2002/0090109 A1* | 7/2002 | Wendt | G06T 1/0071 382/100 |
| 2002/0112034 A1* | 8/2002 | Feik | H04L 63/10 709/219 |
| 2003/0012382 A1 | 1/2003 | Ferchichi et al. | |
| 2003/0028814 A1 | 2/2003 | Carta et al. | |
| 2003/0217006 A1* | 11/2003 | Roever et al. | 705/50 |
| 2004/0230797 A1 | 11/2004 | Ofek et al. | |
| 2004/0252832 A1 | 12/2004 | Domjan et al. | |
| 2005/0283839 A1 | 12/2005 | Cowburn | |
| 2006/0030985 A1 | 2/2006 | Lawida et al. | |
| 2008/0163351 A1 | 7/2008 | Blumenfeld et al. | |

OTHER PUBLICATIONS

"Out of Band Methodology," Jun. 28, 2004, StikeForce Technologies Inc., p. 1-5.

Office Action issued on Aug. 7, 2006 in related U.S. Appl. No. 10/249,963, 11 pages.

Office Action issued on Aug. 30, 2006, in related U.S. Appl. No. 10/412,682, 20 pages.

Office Action issued on Mar. 7, 2007, in related U.S. Appl. No. 10/412,682, 20 pages.

Notice of Allowance issued on Aug. 8, 2007, in related U.S. Appl. No. 10/249,963, 9 pages.

Office Action issued on Oct. 16, 2007, in related U.S. Appl. No. 10/691,970, 16 pages.

Office Action issued on Jun. 20, 2008, in related U.S. Appl. No. 10/691,970, 9 pages.

Office Action issued on Feb. 20, 2009, in related U.S. Appl. No. 10/691,970, 21 pages.

Office Action issued on Sep. 21, 2009, in related U.S. Appl. No. 11/966,428, 10 pages.

Office Action issued on Apr. 28, 2010, in related U.S. Appl. No. 11/966,428, 7 pages.

Office Action issued on Sep. 30, 2010 in related U.S. Appl. No. 11/966,428, 7 pages.

Office Action issued on Oct. 12, 2010 in related U.S. Appl. No. 12/685,235, 20 pages.

Notice of Allowance issued on Jan. 5, 2011 in related U.S. Appl. No. 11/966,428, 6 pages.

Office Action issued on Apr. 5, 2011 in related U.S. Appl. No. 12/685,235, 7 pages.

Notice of Allowance issued on Apr. 21, 2011 in related U.S. Appl. No. 11/966,428, 9 pages.

Office Action issued on May 23, 2012 in related U.S. Appl. No. 13/220,418, 19 pages.

Office Action issued on Jul. 10, 2014 in related U.S. Appl. No. 12/685,235, 23 pages.

Office Action issued on Feb. 11, 2015 in related U.S. Appl. No. 12/685,235, 17 pages.

* cited by examiner

100

Exemplary
out-of-band
token

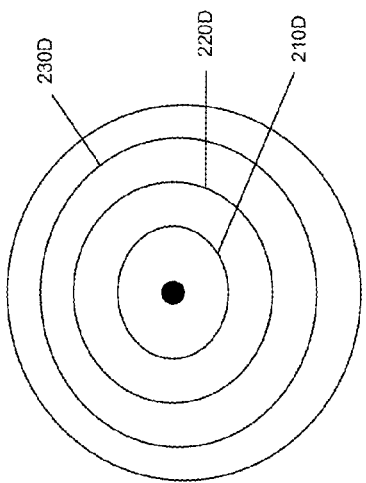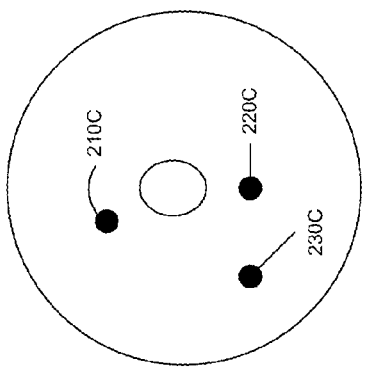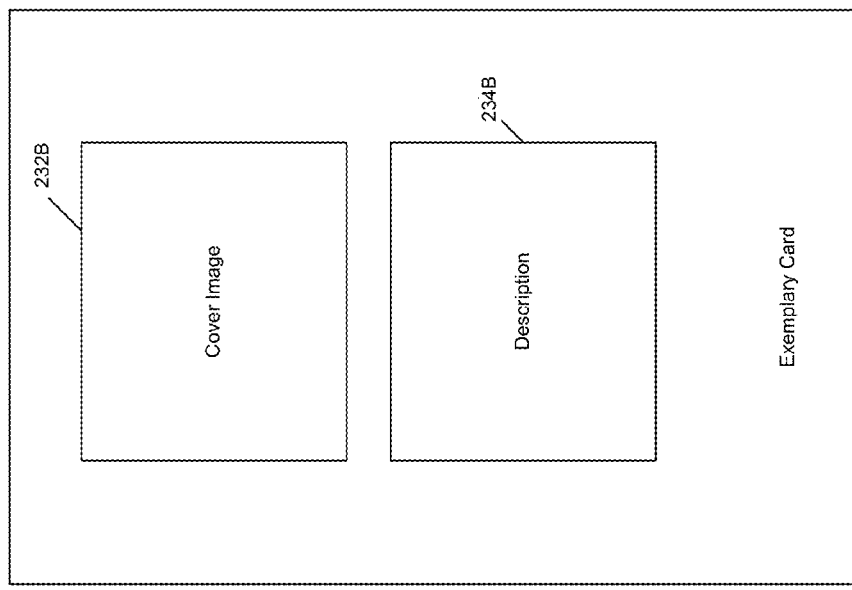

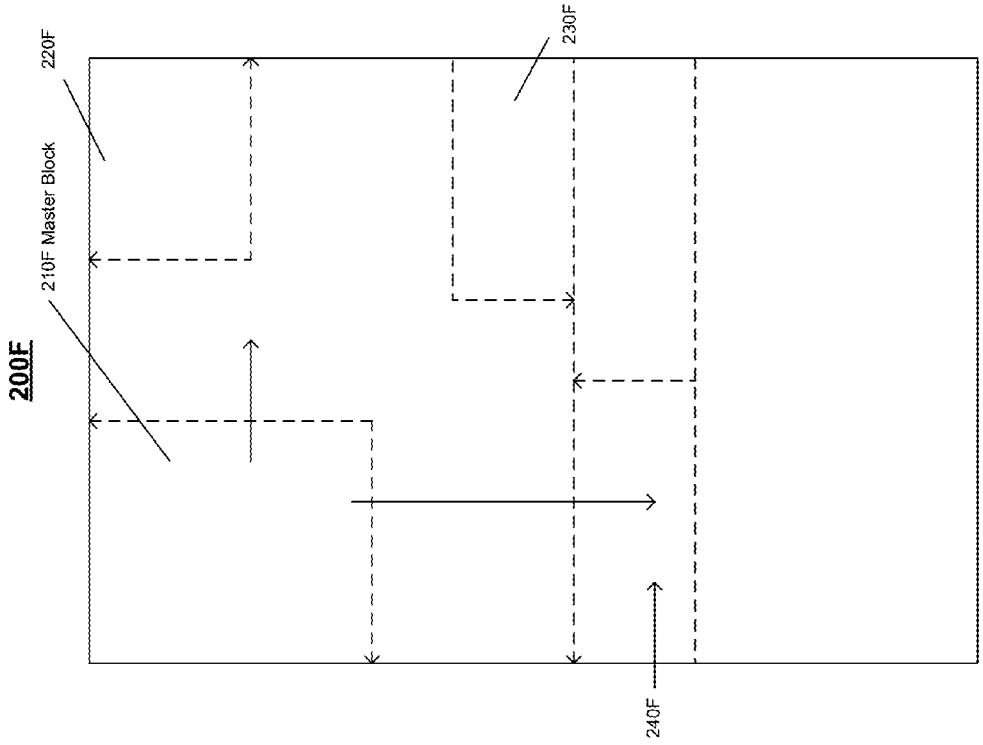
Fig. 2F
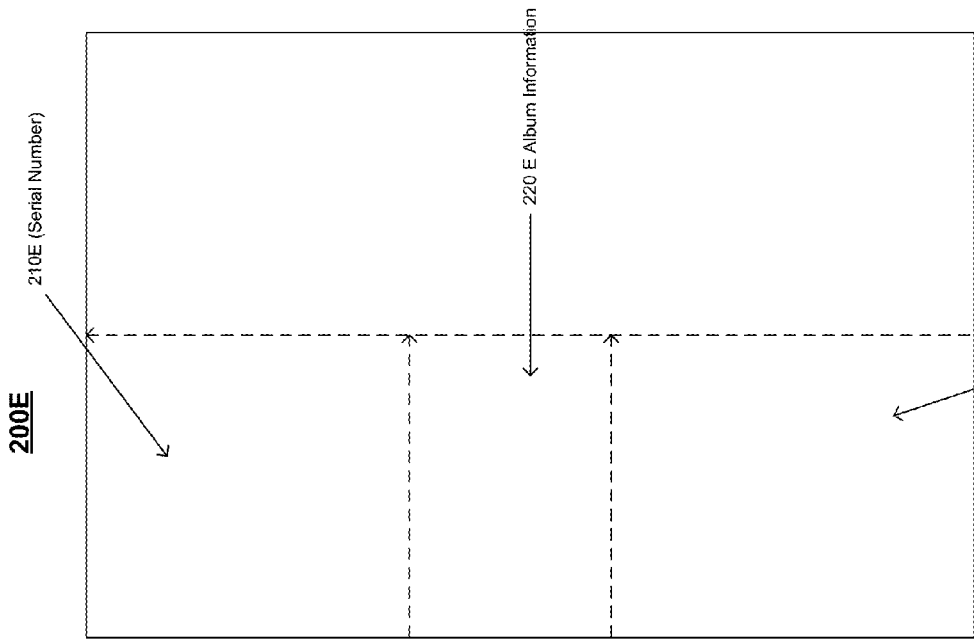
Fig. 2E (Image)

OUT-OF-BAND TOKENS FOR RIGHTS ACCESS

CROSS-REFERENCE TO RELATED APPLICATIONS

This application is a continuation of U.S. patent application Ser. No. 13/220,418, filed Aug. 29, 2011, titled "Out-of Band Tokens for Rights Access," now allowed, which is a continuation of U.S. patent application Ser. No. 11/966,428, filed Dec. 28, 2007, titled "Out-of Band Tokens for Rights Access," now U.S. Pat. No. 8,011,007, which is a continuation of U.S. patent application Ser. No. 10/412,682, filed Apr. 14, 2003, titled "Out-of Band Tokens for Rights Access," now U.S. Pat. No. 7,315,946, which is a continuation-in-part of U.S. patent application Ser. No. 10/334,144, filed Dec. 31, 2002, titled "Out-of-Band Tokens for Rights Access," now abandoned, which claims priority from U.S. Provisional Application No. 60/421,051, filed Oct. 25, 2002, titled "Out-of Band Tokens for Rights Access." Each of these applications is incorporated by reference in its entirety.

TECHNICAL FIELD

This document relates to rights access using out-of-band tokens.

BACKGROUND

The emergence of new technologies has created more channels for dissemination of content, whether access to the content being disseminated is authorized or not. Moreover, with digital copying tools and Internet-based distribution programs, a pirated copy selection may be digitally copied many times without distortion.

SUMMARY

In one general aspect, a content access system includes a storage medium that stores one or more selections of content, an out-of-band token sensor that accesses a passive optical out-of-band token associated with the content, an access controller that determines an access right for the content based on the passive optical out-of-band token, and an authenticating controller to enable access to the content in accordance with the determined access right.

Implementations may include one or more of the following features. For example, the media storage may be an optical disk, a network accessible host, or a jukebox. The jukebox may store multiple selections from different authors. The passive optical out-of-band token may reside on the storage medium. The passive optical out-of-band token may be printed or may include a hologram. A consumer appliance used to access the content may be unable to create the passive optical out-of-band token. The passive optical out-of-band token may be included in the packaging used to distribute the content, and may include a case cover, a packaging insert, or a card.

The out-of-band token sensor may include an image detector configured to read an image placed before the image detector. The image detector may determine optical values at selected locations in the passive optical out-of-band token. The selected locations may be randomly selected locations from within the passive optical out-of-band token, and may be identified by a master location in the passive optical out-of-band token. The passive optical out-of-band token may spin to permit the out-of-band token sensor to read a pattern that results from spinning the passive optical out-of-band token. The passive optical out-of-band token may reside on more than one surface. The authenticating controller may supply a default rule as to when the out-of-band token may be accessed. The default rule may include a read-only permission.

The out-of-band token sensor may poll an access right data store with more than one access right. The out-of-band token sensor may access the access right data store through a communications network. A first registering processor may register the out-of-band token. A second registering processor may modify the access right upon registering the out-of-band token. The authenticating controller may specify a number of times that the content may be accessed, specify a number of times that the content may be copied, and/or specify the devices on which the content may be accessed.

Implementations also may include a sequence of steps performed on the content access system to achieve these features. Other features will be apparent from the following description, including the drawings, and the claims.

DESCRIPTION OF DRAWINGS

FIG. 2B illustrates an exemplary card that may be used to signal access rights.

FIGS. 2C and 2D together illustrate an exemplary medium showing how information appearing on the surface of a medium may generate an out-of-band token when the medium shown in FIG. 2C is spun.

FIG. 2E illustrates yet another exemplary out-of-band token.

FIG. 2F is an exemplary image that illustrates how the master location may dynamically generate an out-of-band token.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region. Similarly, illustrated processes may each include numerous subprocesses.

DETAILED DESCRIPTION

For illustrative purposes, FIGS. 1-6 describe a content access system for administering access to content. Generally, a consumer appliance in the content access system generates or receives requests for access to content that may include one or more selections. Before satisfying such a request, the consumer appliance may access an out-of-band token associated with the content, may determine an access right for the content based on such an out-of-band token, and may enable access to the content in accordance with the determined access rights.

Generally, the token describes rights access information that is used to identify access rights appropriate for the content, which rights may vary based on the user, individually or categorically. An out-of-band token resides in a different channel than the content, where the channel for the content and the token may be of consistent type (e.g., both optical) or different type (e.g., magnetic and optical). Thus, the electronic medium and out-of-band token generally are detected using different sensors. For example, an out-of-band token for content recorded on a compact disk may include a holographic image displayed on the compact disk surface or cover.

The following simplified example is provided to illustrate use of an optical token on the case of an optical disk. In this example, a consumer inserts the optical disk into a disk player and swipes the optical disk case underneath an optical sensor that is configured to discern access rights from context indicia embedded in or otherwise attainable from the optical disk case. Using the discerned access rights, the disk player determines whether the requested access is available and acts appropriately to enable or deny access (e.g., play a song from the optical disk if it is determined that the access rights allow such access).

Figure 1:
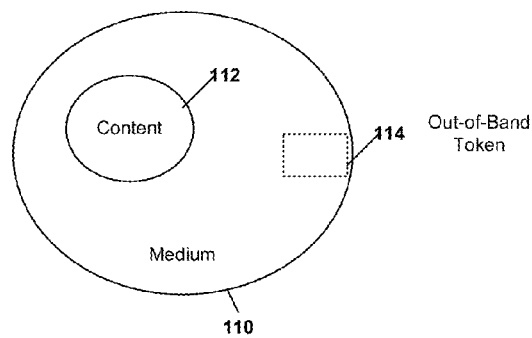
FIG. 1 illustrates an exemplary content access system.
Figure 1:
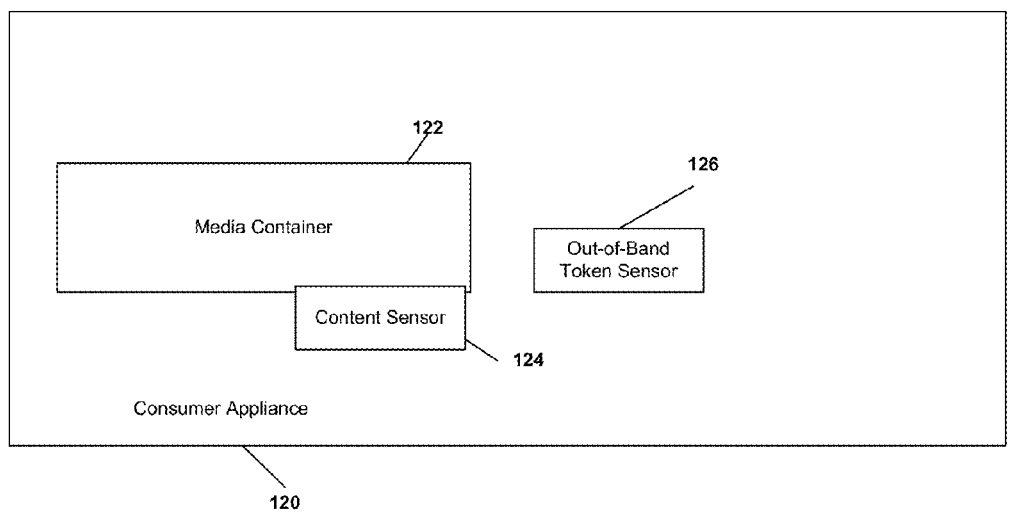

FIG. 1 illustrates one implementation of a content access system 100 configured to administer access to content. The content access system 100 includes a medium 110 and a consumer appliance 120. The medium 110 includes content 112 (e.g., electronic or optical) and an out-of-band token 114 associated with the content 112. The consumer appliance 120 includes a media container 122, a content sensor 124, and an out-of-band token sensor 126. The consumer appliance 120 may use the out-of-band token sensor 126 to read the out-of-band token 114, and may use the results of the reading to determine access rights to the content 112.

Generally, the medium 110 includes one or more devices configured to store content. Formats of the medium 110 have been generally described previously. The medium 110 may be embodied or included in a portable dedicated storage device, such as a memory/storage key or a floppy, compact, optical (e.g., CD ("compact disc"), DVD ("digital video disk"), HD-DVD ("high definition digital video disk")), digital, versatile, or MP3 disk. Alternatively, the medium 110 may be included or integrated in another system, which may or may not be portable or remote. For example, the medium 110 may include a hard drive of a consumer appliance 120, which may be used as an access-regulated jukebox to enable multiple selections of content depending on the configuration of the consumer appliance 120 and the access rights for a user accessing the jukebox. Alternatively, the medium 110 may reside on a remote system that is accessible to a consumer appliance 120 and that is operated by a third party, such as a record label.

Generally, the content resides in the channel for which the medium was designed. For example, in an optical disk medium, the content (e.g., a song) is stored as optical binary bits. These optical bits may be read by targeting a location in the optical disk with an optical transceiver and determining whether each of a series of optical bits is logically set to a '1' or '0'. Alternatively, if the medium 110 includes a compact flash card or a hard disk drive, the content 112 may reside in the memory in the compact flash card or on the magnetic platters of the hard disk drive.

The out-of-band token 114 is an authentication system configured to establish access controls or permissions for the content. The out-of-band token 114 and content 112 reside in different frequencies, channels, mediums or physical structures, or formats so that the out-of-band token 114 is not read by the sensor used to read the content 112. For example, when using different frequencies to achieve independence among content 112 and token 114, the content 112 may be read at a first wavelength and the out-of-band token 114 may be read at a second wavelength.

The out-of-band token 114 may be configured so that a consumer may be unable to create the out-of-band token 114. For example, a consumer may be able to distribute the content, for example, using file sharing protocols and optical disk writing technologies. However, a mint with equipment that is not accessible to consumers may write the out-of-band token 114. The mint may include an industrial printer or a hologram writer. The mint also may be configured to associate a particular instance of the medium 110 or the content 112 with the out-of-band token 114 being fabricated. For example, the mint may associate a serial number for the medium 110 or the content 112 with the out-of-band token 114. Thus, an out-of-band token 114 associated with a first medium 110/piece of content 112 may not used with a second medium 110/piece of content 112.

The out-of-band token 114 need not be distributed with the medium 110. For example, a content provider may electronically distribute selections of content to one or more storage locations. At a later time, a consumer may use the out-of-band token 114 to unlock the content, which has been electronically distributed and is already residing in, for example, an electronic jukebox.

The out-of-band token 114 may describe the instances of content 112 that may be accessed. For example, the out-of-band token may include a serial number printed on the surface of a disk. This serial number also may be stored in the content on the optical disk.

The out-of-band token 114 may be a passive device that is not required to be electronically interrogated. In contrast, an active out-of-band token 114 may include an electronic or magnetic interface that is interrogated electronically. For example, the out-of-band token 114 may include a disk cover that is read by an optical "eye" configured to read disk covers. One example of an active out-of-band token 114 is an electronic key that is inserted into a key reader. The key reader may electronically probe key logic and/or memory to make an access control determination.

The consumer appliance 120 includes a medium container 122, a content sensor 124, and an out-of-band token sensor 126. Generally, as described in greater detail with respect to FIG. 3, the consumer appliance 120 is configured to (1) receive and secure medium 110 using medium container 122, (2) read the out-of-band token 114 using the out-of-band token sensor 126, (3) determine access rights based on the token 114, and (4) read the desired content from the medium 110 using the content sensor 124 (e.g., an optical or magnetic head) if sufficient rights exist.

The consumer appliance 120 also may include and run one or more software applications. For example, the consumer appliance 120 may run a software application configured to administer a rights access program. The rights access program may be used to determine an access right for the content. Other software applications on the consumer appliance 120 may include a software application configured to display content information (e.g., a cover, lyrics, artist information, and/or purchasing information for the content). Although the consumer appliance 120 in one sense, may relate to other consumer appliances, such as a CD player and/or a DVD player, the consumer appliance 120 also may relate to more flexible electronic equipment such as a personal computer.

For example, a computer may be configured as a stereo system that runs a general-purpose operating system with one or more media applications performed by a general operating system and a general-purpose processor. Additionally, the computer may be configured to respond to controls such as those typically found on a stereo system (e.g., a volume control dial).

The media container 122 is a device configured to receive and support a medium 110. For example, the media container 122 may include a tray configured to hold an optical disk and retrieve the optical disk into the consumer appliance 120 to play the content on the optical disk. Alternatively, the medium container 122 may include a slot, a pressed-on lid used to insert an optical disk, a container configured to play various forms of electronic storage (e.g., compact flash, non-volatile memory), or some other mechanism capable of receiving and supporting a medium 110.

The content sensor 124 includes a detector configured to read content 112 residing in a medium 110 that has been placed in or that is supported by the media container 122. The content sensor 122 may include an optical transceiver configured to read content written to or otherwise stored by an optical medium 110, such as an optical disk. Another example of the content sensor 124 may include a compact flash reader configured to read electronic and/or magnetic mediums.

The content sensor 124 may be integrated with the media container 122. For example, the content sensor 124 may be configured to read an optical disk that has been placed in a tray configured to secure the optical disk. The tray may retrieve the optical disk, rotate the optical disk, and control the location of the content sensor to read an appropriate portion of the content, such as, for example, a particular track.

The out-of-band token sensor 126 includes a device configured to read an out-of-band token 114 associated with content 112. The token 114 then may be used to determine an access right for the content 112. Using an out-of-band token sensor 126, it is possible to detect or otherwise identify, infer or resolve access rights based on information that does not actually reside within the content 112 in the medium 110 itself. That is, to determine the access rights appropriate for the content 112 or the medium 110 itself, out-of-band sensor 126 may be used to access another source of information that resides in the medium 110 or a channel that is distinct from the medium 110 or the channel of information used to store the content 112. Furthermore, the out-of-band token sensor 126 may be configured to read a token 114 that is physically located proximate to or even sharing the same physical structure as the content 112. For example, the out-of-band token sensor 126 may read an out-of-band token 114 residing as an image printed the surface of an optical disk. Thus, to access the content 112, a first optical detection device may be used to play a CD (e.g., content sensor 124), while a different sensor (e.g., out-of-band token sensor 126) is used to access the out-of-band information residing on the label of the CD itself.

The out-of-band token sensor 126 may include a device distinct from the content sensor 124, or the out-of-band token sensor 126 may be co-located with the content sensor 124. For example, the out-of-band token sensor 126 may be configured to read the label affixed to the surface of a medium 110 that is inserted in the media container 122. By way of contrast, the out-of-band token sensor 126 in another example may not be co-located with the content sensor 124. For instance, the out-of-band token sensor 126 may read a label on the optical disk that is swiped under an external out-of-band token sensor 126 before the optical disk is placed in a tray acting as the media container 122. In another configuration, the out-of-band token sensor 126 may be configured to read out-of-band tokens 114 that are not co-located with the medium 110. For example, the medium 110 may be inserted in the media container 122, and the cover of a case for the medium 110 may be swiped or placed before an out-of-band token sensor 126 that is configured to read one or more portions of the case cover to determine the access rights for the content.

The out-of-band token 114 may be stored on the medium 110 (e.g., the label on the surface of the optical disk) as a hologram that is written onto the optical disk but that resides in a different band than the content itself. Furthermore, the hologram itself need not be stored as digital information. For example, the hologram may comprise an analog image that may be scanned by the out-of-band token sensor 126.

Generally, FIGS. 2A-2F illustrate exemplary out-of-band tokens.

Figure 2A:
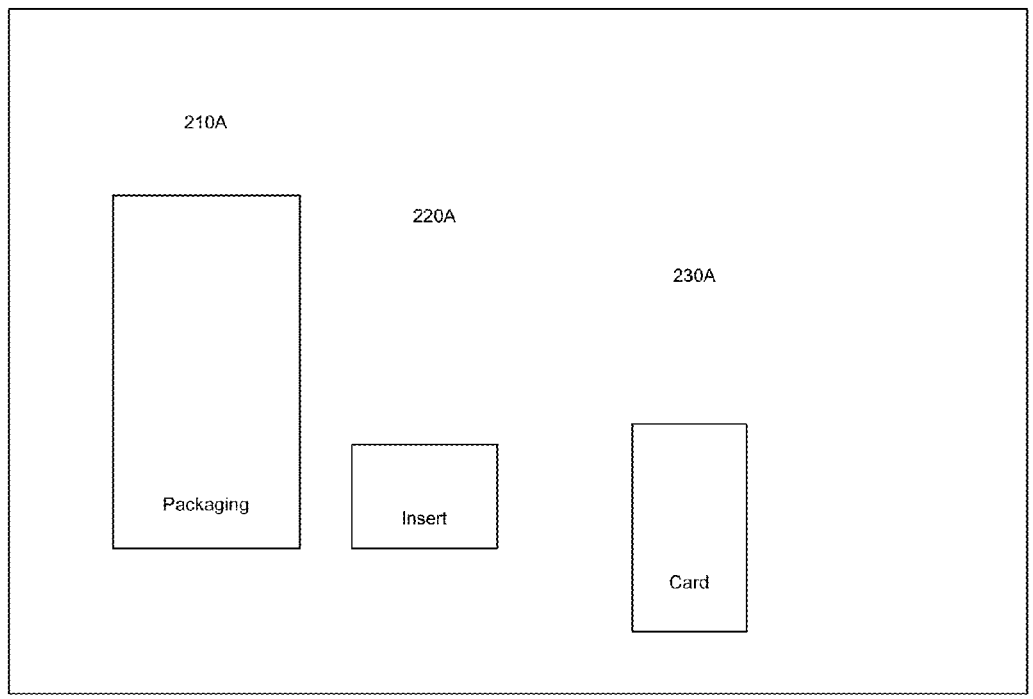
FIG. 2A illustrates examples of devices that may be included in a distribution of a medium and that may be used as an out-of-band token.

Referring to FIG. 2A, one or more items may be distributed as packaging 200A for medium 110 and used as an out-of-band token 114. When configured to act as an out-of-band token 114, these items may be read by the out-of-band token sensor 126 described in FIG. 1. Generally, the systems in the packaging 200A may be distributed with the medium 110.

Specifically, the medium 110 described by FIG. 1 may be distributed with packaging 210A, an insert 220A, and/or a card 230A. For example, DVD disk packaging 200A may include a paper insert 220A that is descriptive of the DVD tracks, the credits and the lyrics. The insert 220A may include a guide to lyrics that is being distributed with a CD. Additionally, a card 230A with a high quality image may be distributed. The card 230A may be used to describe the content on the medium itself (e.g., track descriptions). For example, the card may be inserted in a jacket and collected by an owner.

Typically, in addition to the items shown by FIG. 2A, the packaging 210A includes one or more devices or components configured to protect the medium from being damaged. The packaging also may include one or more theft deterrent devices and/or logistics management components configured to manage the medium itself. For example, the packaging may include a bar code and/or an RF ("Radio Frequency") identification sensor that may be used in support of inventory and security functions. These items also may be used as out-of-band tokens.

The medium may include an optical disk with one or more pieces of content available for use. This content may be digitally secured (e.g., encrypted). Alternatively, the medium may include content that is not secure and instead relies on a consumer appliance 120 to administer a rights access scheme.

Referring to FIG. 2B, an exemplary card 230B may be configured to act as an out-of-band token. Generally, the card 230B relates to the card 230A described previously in the context of packaging 200A in FIG. 2A. However, card 230B may include a cover image 232B and a description 234B and may have an image used to determine access rights. Although information in the image may not be discernable to the naked eye of an observer, the out-of-band token sensor 126 may detect information residing in the image and use that information to determine the user access rights. For example, user access rights may be specified by a certain color or pattern appearing in a portion of the image used on the album cover 232B. Card 230B also illustrates how the access rights may be incorporated into a card 230B that may be useful to the user as a medium identifier.

Referring to FIGS. 2C and 2D, an exemplary medium 200C illustrates how an out-of-band token may be generated from information appearing on the surface of a medium 110. The out-of-band token sensor 126 may be configured to read token information that is not generated until the medium 110 itself is processed. For example, a pattern of information may be written to the label on an optical disk. As the label is spun, a pattern may be generated on the surface of the optical disk, which may be read to determine the access rights for the content. For example, the information may be encoded in areas 210C, 220C, and 230C of the medium 200C. As medium 200C is spun, an out-of-band token 200D may be generated and read from the surface of the medium 200C, as shown by the exemplary pattern of rings illustrated by FIG. 2D. When spun, the images 210C, 220C, and 230C generate rings 210D, 220D, and 230D, which may be used to determine the access rights.

Referring to FIG. 2E, an image 200E may be used as an out-of-band token 114 with encoded access rights. Image 200E includes a first portion configured to encode an identifier (e.g., a serial number 210E), a second different portion configured to describe a second identifier (e.g., medium information 220E), and a third portion configured to define the access rights 230E. As such, the serial number, medium information and access rights may be co-located or they may be located in different portions of the image.

Similarly, not all portions of the image must be used. In fact, only a portion of the image may be used to determine the access rights. Similarly, different portions of the image may be used for different instances of the medium 110. For example, for a first user the access rights may be found in the upper left-hand corner, whereas, for the same content on a second medium, the access rights may reside in the lower right-hand corner.

The location of the access rights in the out-of-band token may or may not be specified in the same portion in advance. For example, in FIG. 2F, image 200F illustrates how a master location may be located on an image that indicates where the user access rights are located in that image. For example, in image 200F, master location 210F indicates that regions 220F, 230F, and 240F should be used to determine the access rights. The master location may be located in a different portion of the image. For example, in one image, the master location may be located in the lower left-hand corner whereas, for the same content, the master location may be located in the upper right-hand corner. The access rights may be located in randomly-selected locations from within the image.

Although several out-of-band tokens are shown, the out-of-band tokens are not limited to the out-of-band tokens shown in FIGS. 2A-2F. For example, other out-of-band tokens may include, but are not limited to, a promotional item also configured to act as an out-of-band token.

Figure 3:
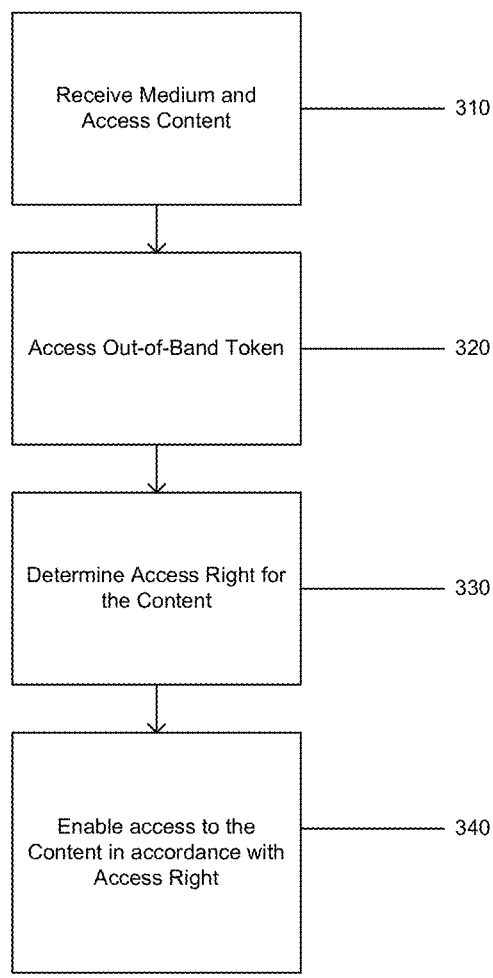
FIG. 3 illustrates an exemplary flow chart of a process for accessing content leveraging an out-of-band token.

Referring to FIG. 3, a flow chart 300 illustrates an exemplary process for administering access to content. Generally, flow chart 300 may be performed on systems that have been described previously (e.g., consumer appliance 120 using medium 110).

As shown, the medium is received and the content is accessed (step 310). Receiving the medium and accessing the content may include inserting a medium 110 into a consumer appliance 120. Accessing content also may include downloading content from a remote system. For example, a song may be downloaded from the Internet.

The out-of-band token may be accessed (step 320). Generally, accessing the out-of-band token involves enabling the out-of-band token sensor 126 to read one or more out-of-band tokens 114. For example, after an optical disk has been inserted into a consumer appliance 120, the consumer appliance 120 may check the optical disk for an out-of-band token 114 residing on the surface of the optical disk and also may prompt the consumer to swipe an album cover underneath an additional out-of-band token sensor 126. Accessing an out-of-band token may involve more than one operation. For example, a consumer may be initially prompted for a first portion of the out-of-band token 114 and then subsequently prompted for another portion of the out-of-band token 114. More specifically, a first portion of the out-of-band token 114 may provide one indicia of access (e.g., the content serial number) and the second portion may be used to provide another indicia of access (e.g., the access rights).

With the content and the out-of-band token accessed, the access rights are determined (step 330). Generally, determining the access right for the content includes determining how a user may access the content. For example, permission to read, copy, and distribute the content may be indicated. Additionally, the access right may be set based on the device upon which the content is being accessed. For example, access rights may be limited to a particular consumer appliance, or a particular class of consumer appliances (e.g., a portable device).

Determining an access right for the content may include determining that no access rights have been identified. This may, in turn, trigger the application of one or more default rules based on user, device, and/or the content criteria. For example, a default set of rules may be established and referenced for a particular user or class of users, a particular type of electronic content, or a particular class of consumer appliance. One such default rule may determine that the access right includes read-only or some other predetermined permission level.

Determining the access right also may include retrieving an access right data store of more than one access right. This access right data store may be accessed through a communications network, such as the configuration where the access right data store resides on a remote host 150. Determining the access right also may include determining precisely how the content may be accessed. For example, determining the access right may include specifying a number of times the content may be accessed.

With the access right determined, access to the content is enabled in accordance with the access right (step 340). For example, a controller on a consumer appliance 120 may be directed to enable only read rights to content and preclude the user from copying the content.

As an optional step (not shown), the out-of-band token may be registered. Registering the out-of-band token may enable the access rights to be modified. For example, until the out of the band token is registered, the access rights may be set to read-only permissions. However, upon determining that the user has registered the out-of-band token, the user may be given permission to make a predetermined number of copies of the electronic content. Although the steps described in flow chart 300 appear in a serial order, they may be performed in parallel and/or in a different order. For example, although accessing content 112 is shown as being performed after accessing the out-of-band token 114, those access operations may be performed in reverse order or in parallel. Thus, a user may read an image with the out-of-band token on an optical disk after the optical disk is inserted. Similarly, the optical disk may be inserted and then a cover image may be read to access the out-of-band token, or the cover image may be read concurrently with insertion of the optical disk in the consumer appliance 120.

Figure 4:
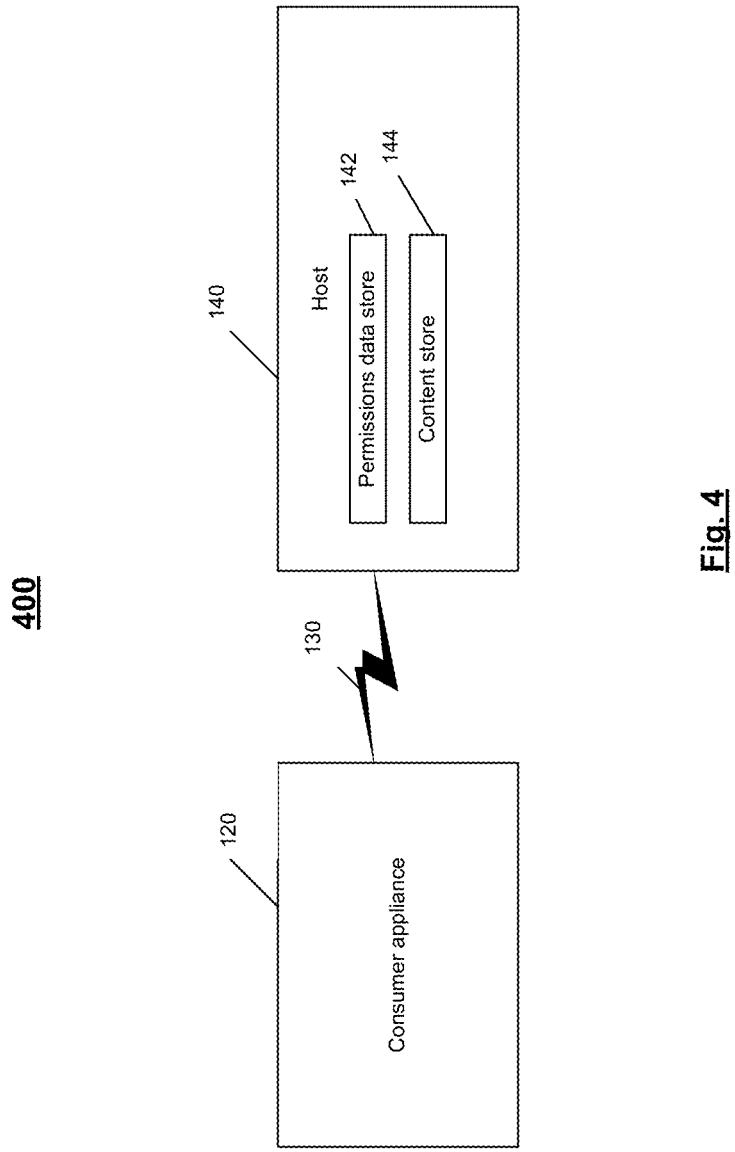
FIG. 4 illustrates an exemplary communications system that includes a media player configured to access a host.

Referring to FIG. 4, an exemplary communications system includes a media player 120 configured to access a remote data store 140 using a communications line 130. Generally, the consumer appliance 120 relates to the consumer appliance 120 described previously with respect to FIGS. 1-3. However, the consumer appliance 120 of FIG. 4 includes a network device configured to use a communications link 130 to determine access rights and/or retrieve content from remote data store 140.

The communications link 130 typically includes a delivery network making a direct or indirect communication between the consumer appliance 120 and the host 140, irrespective of physical separation. Examples of a communications link 130 include the Internet, the World Wide Web, WANs ("Wide Area Networks"), LANs ("Local Area Networks), analog or digital wired and wireless telephone networks (e.g., PSTN ("Public Switched Telephone Network"), ISDN ("Integrated Services Digital Network"), and xDSL ("any type of Digital Subscriber Loop"), radio, television, cable, satellite, and/or any other delivery mechanism for carrying data. The communications link 130 may include communication pathways that enable communications through the two or more delivery networks. Each of the communication pathways may include, for example, a wired, wireless, cable or satellite communication pathway.

The host 140 is generally capable of executing instructions under the command of a host controller (not shown). The host 140 may include one or more hardware components and/or software components. An example of a host 140 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

The controller is a software application loaded on the host 140 for commanding and directing communications with the consumer appliance 120. Other examples include a program, a piece of code, an instruction, a device, a computer, a computer system, or a combination thereof, for independently or collectively instructing the consumer appliance 120 or the host 140 to interact and operate as described. The consumer appliance 120 and the host 140 may be embodied permanently or temporarily in any type of machine, component, physical or virtual equipment, storage medium, or propagated signal capable of providing instructions to the consumer appliance 120 or the host 140.

The host may include a permissions data store 142 and/or a content store 144. The permissions data store 142 includes a program, an application or a device configured to provide security, rights access, and/or authentication services for the host 140. For example, the permissions data store 142 may include a listing of serial numbers and associated out-of-band tokens. Alternatively, the permissions data store 142 may include listings of user identification information and content that the user is allowed to access.

Typically, the content store 144 enables the consumer appliance 120 to access online content. Other services provided as part of the content store may include programs that aid in content selections, and e-commerce programs that enable access rights to be purchased or acquired. In one example, the content store 144 may enable a consumer to find electronic content produced by the same artist. In another example, the content store may enable the consumer to purchase the access rights.

Figure 5:
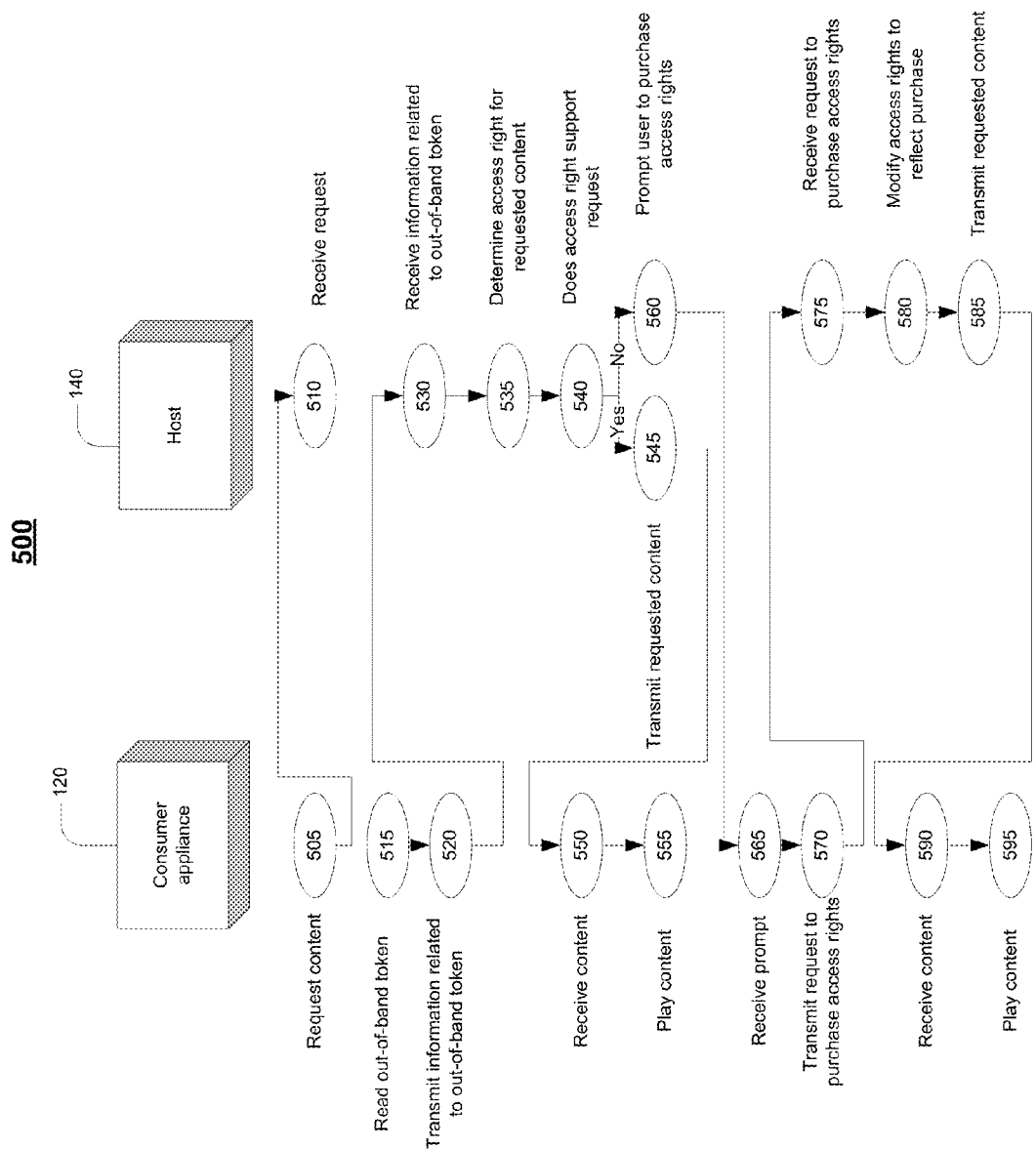
FIG. 5 illustrates an exemplary flow chart of a process performed by a media player configured to access a host.

FIG. 5 illustrates an exemplary flow chart 500 of a consumer appliance configured to access a host. Generally, the consumer appliance 120 and the host 140 relate to the consumer appliance 120 described previously with respect to FIGS. 1-4 and the host 140 described with respect to FIG. 4.

Initially, the consumer appliance 120 requests content (step 505). The requested content may reside locally on the consumer appliance 120 (e.g., on an optical disk in an optical disk player), or the requested content may reside on a host. The host 140 receives the request (step 510). The consumer appliance 120 then reads the out-of-band token (step 515). Reading the out-of-band token may include using a card reader to read a card that has been purchased with access rights. The consumer appliance 120 transmits information related to the out-of-band token (step 520). Transmitting information related to the out-of-band token may include transmitting information that enables an access right to be determined. For example, the out-of-band token may include an image written to a card. The image may be read to determine a serial number. This serial number may be used as a reference to determine the access rights.

The host 140 receives the information related to the out-of-band token (step 530) and uses that information to determine the access right (step 535). Determining the access right may include referencing a user's permissions residing on a permissions store 142. For example, a registered user may be given a set of permissions for a set of content. For example, the user may be allowed to copy a first piece of content. Alternatively, the access rights may be associated with a particular consumer appliance. For example, access to some content may be determined based on the identity of the consumer appliance being used to access the content.

The host 140 determines whether the access rights support the request for content (step 540). Determining whether the access rights support the request for content includes determining whether the permissions related to the out-of-band token allow for the content to be accessed in the requested manner. If the access right does support the requested content (step 545), the consumer appliance 120 may receive the content (step 550) and play the content (step 555).

When the access rights do not support the request, the host 140 may be configured to enable the user to acquire the access rights. For example, the user may be prompted to purchase access rights (step 560). The user may receive the prompt (step 565). Receiving the prompt may include generating a display on the consumer appliance 120 enabling the user to acquire the content. For example, the user may have a payment link established so that the user may conveniently purchase access rights by reading an out-of-band token that identifies the user. In another example, the consumer appliance may prompt the user for payment information.

If the user elects to purchase access rights for the requested content, the consumer appliance 120 transmits the request to purchase access rights (step 570). The host 150 receives the request to purchase access rights (step 575). The host 150 then executes a transaction so that the access rights may be purchased (e.g., a credit card is charged) (not shown). With the access rights purchased, the host 140 modifies the access right to reflect the purchase (step 580). Modifying the access right to reflect the purchase may include adjusting a user record in a permissions data store 142 so that the user may access the requested content. Modifying the access right also may adjust an access right that is locally maintained on the consumer appliance. For example, an optical disk player may have local permissions. Modifying the access right may adjust the local permissions to enable access to the content without requiring the consumer appliance to subsequently access the host 140.

Where the content does not reside on the consumer appliance 120, the host 140 may transmit the content to the consumer appliance 120 (step 585). Transmitting the content to the consumer appliance 120 may include enabling the consumer appliance to download a particular file with the requested content. The consumer appliance receives the content (step 590 and plays the content (step 595).

Figure 6:
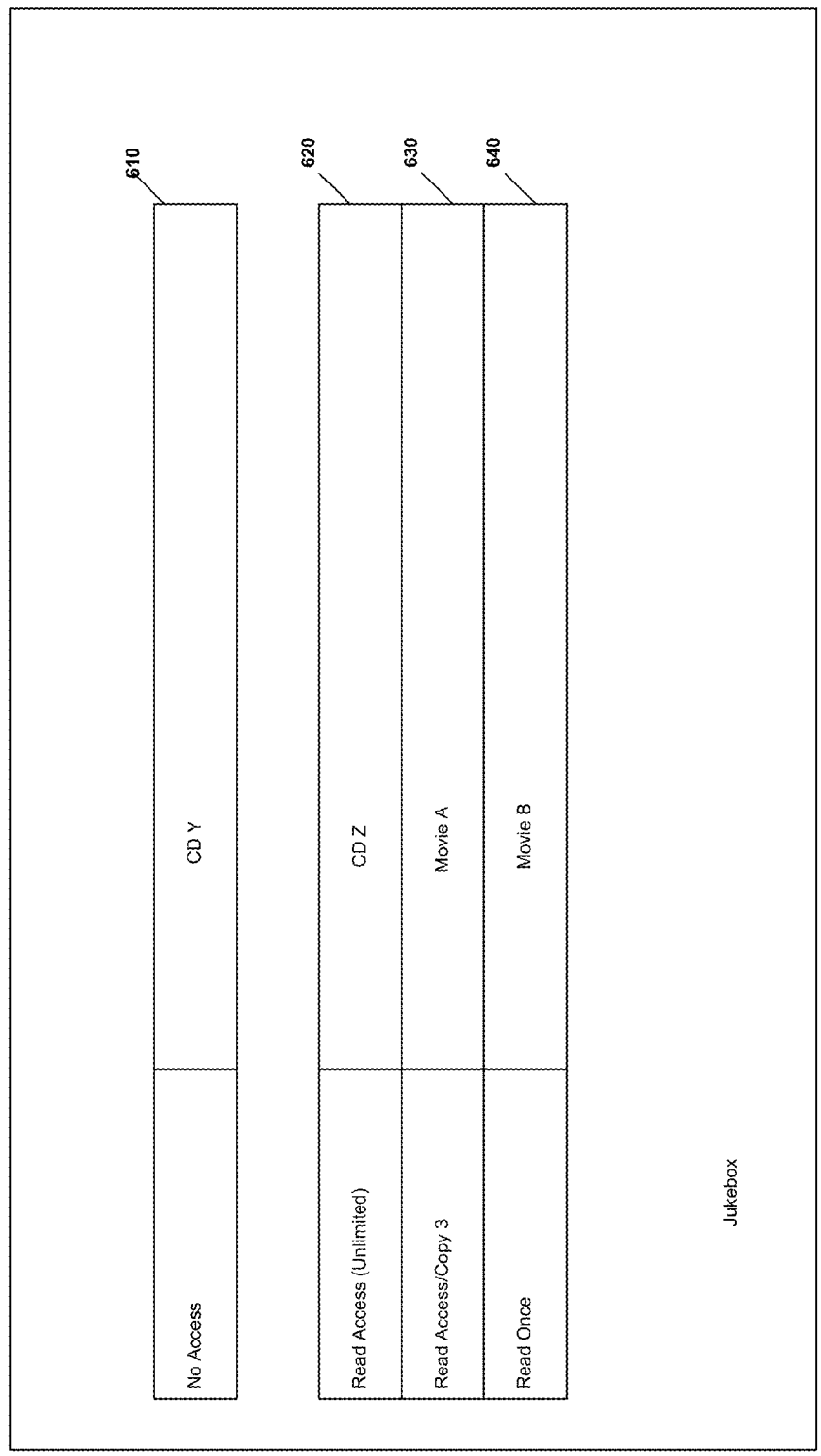
FIG. 6 illustrates an exemplary jukebox configured to act as a content access system.

FIG. 6 shows an exemplary list of access rights for an exemplary jukebox system 600. In jukebox 600, a content piece is selected along with access rights for the content. Generally, the jukebox 600 relates to the content access system 100 described in FIG. 1. However, FIG. 6 illustrates how the consumer appliance 120 may function as a jukebox. Typically, a jukebox 600 includes more than one content piece that may be selected, with multiple content pieces residing in a common location or consumer appliance.

In the example shown in FIG. 6, the jukebox 600 includes content that may be selectively accessible. Jukebox 600 includes records 610-640, with each record describing a piece of content and the related access right. In jukebox 600, record 610 describes a stored CD Y, for which the illustrated user has no access privileges, but for which the user may gain access privileges by purchasing use rights that are made available through use of an out-of-band token that enables access to the content. For example, a user may purchase a card 230A that unlocks CD Y for the holder of the card 230A. The jukebox 600 may include an out-of-band token sensor 126 configured to read the card 230A.

In jukebox 600, record 620 indicates that the user is given unlimited read access to CD Z. For example, the illustrated user may have purchased the CD and, by virtue of the purchase, may have unlimited listening rights to the CD. The access rights regulating unlimited access to the CD may have been established by the user using out-of-band token 114 to unlock the unlimited access rights to CD Z.

In contrast to the unlimited access rights to CD Z, for Movie A, record 630 indicates that the user has read access rights and may make a limited number of copies of Movie A. Also, record 640 indicates that the user has read-once access rights for Movie B. This may be because, for example, Movie B is being distributed in a promotion and the user has received read once access rights in the course of participating in the promotion. For example, a marketing company may distribute promotional items in a magazine. The magazine promotion may include the card 230A, which may be read by the out-of-band token sensor 126 residing in jukebox 300. Upon accessing Movie B once, the user's access rights to Movie B may be terminated.

The jukebox 600 may use a host-based system to track the number of copies or viewings. For example, a user may register their instance of the content on a host-based registry. Upon copying the content, a counter may be decremented to reflect that the user has consumed one of his rights. When the counter indicates that no more access rights exist, permission to perform the copying may be denied.

Other implementations are within the scope of the following claims. For example, the consumer appliance may distribute the operations across one or more systems and/or proxies. In another example, the content may be accessed on a first device, while the out-of-band token is accessed on another device. For example, a consumer appliance that reads the optical disk may be used to read the content while an optical sensor attached to a personal computer may access the out-of-band token. The content then may interface with the out-of-band token sensor to determine the access rights for the content.

A number of aspects of the consumer appliance have been described. An out-of-band token that is not illustrated but may be used includes a serial number that is printed on the medium 110. Nevertheless, it will be understood that various modifications may be made without departing from the spirit and scope of what is claimed. Accordingly, other implementations are within the scope of the following claims.

What is claimed is:

1. A method for enabling access to media content, the method comprising:
   receiving, by a media content player, a request to access particular media content;
   receiving, by the media content player, a visual representation of an out-of-band token that both specifies (i) the particular media content and (ii) media content access rights to the particular media content and resides in a different format than a medium used to store the particular media content, where receiving the visual representation of the out-of-band token includes receiving the visual representation of the out-of-band token from an image detector, where receiving the visual representation of the out-of-band token from the image detector includes determining optical values at selected locations in the out-of-band token;
   determining, by the media content player, media content access rights to the particular media content from the visual representation of the out-of-band token that specifies (i) the particular media content and (ii) media content access rights to the particular media content;
   determining, by the media content player, whether the media content access rights to the particular media content determined from the visual representation of the out-of-band token specify that access to the particular media content is permitted; and
   in response to determining that the media content access rights to the particular media content determined from the visual representation of the out-of-band token specify that access to the particular media content is permitted, enabling, by the media content player, access to the particular media content through the media player.

2. The method of claim 1, wherein the out-of-band token is a passive out-of-band token that is not required to be electronically interrogated.

3. The method of claim 1, wherein the out-of-bank token is received from a content media provider as part of a promotional document.

4. The method of claim 1, wherein the out-of-band token is printed.

5. The method of claim 1, wherein the out-of-band token includes a hologram.

6. The method of claim 1 comprising:
   detecting the out-of-band token is placed before an image detector,
   wherein receiving the visual representation of the out-of-band token from an image detector is in response to detecting the out-of-band token is placed before the image detector.

7. The method of claim 1, wherein the selected locations are randomly selected locations from within the out-of-band token.

8. The method of claim 1, wherein the selected locations are identified by a master location in the out-of-band token.

9. The method of claim 1, wherein enabling access to the particular media content includes specifying a number of times the media content may be accessed.

10. The method of claim 1, wherein the out-of-band token resides on more than one surface.

11. The method of claim 1, further comprising registering the out-of-band token with a host.

12. The method of claim 11, further comprising modifying the determined media content access right to provide additional access to the particular media content upon registering the out-of-band token with the host.

13. The method of claim 1, wherein receiving, by a media content player, a request to access particular media content, comprises:
   receiving a request to access media content from a remote media content provider.

14. The method of claim 1, wherein receiving, by a media content player, a request to access particular media content, comprises:
   receiving a request to access media content stored on the media player.

15. The method of claim 1, wherein the visual representation of the out-of-band token comprises an image of the out-of-band token.

16. A system comprising:
   one or more computers and one or more storage devices storing instructions that are operable, when executed by the one or more computers, to cause the one or more computers to perform operations comprising:
      receiving, by a media content player, a request to access particular media content;
      receiving, by the media content player, a visual representation of an out-of-band token that both specifies (i) the particular media content and (ii) media content access rights to the particular media content and resides in a different format than a medium used to store the particular media content, where receiving the visual representation of the out-of-band token includes receiving the visual representation of the out-of-band token from an image detector, where receiving the visual representation of the out-of-band token from the image detector includes determining optical values at selected locations in the out-of-band token;
      determining, by the media content player, media content access rights to the particular media content from the visual representation of the out-of-band token that specifies (i) the particular media content and (ii) media content access rights to the particular media content;
      determining, by the media content player, whether the media content access rights to the particular media content determined from the visual representation of the out-of-band token specify that access to the particular media content is permitted; and
      in response to determining that the media content access rights to the particular media content determined from the visual representation of the out-of-band token specify that access to the particular media content is permitted, enabling, by the media content player, access to the particular media content through the media player.

17. The system of claim 16, wherein the out-of-band token is a passive out-of-band token that is not required to be electronically interrogated.

18. A non-transitory computer-readable medium storing software comprising instructions executable by one or more computers which, upon such execution, cause the one or more computers to perform operations comprising:
   receiving, by a media content player, a request to access particular media content;
   receiving, by the media content player, a visual representation of an out-of-band token that both specifies (i) the particular media content and (ii) media content access rights to the particular media content and resides in a different format than a medium used to store the particular media content, where receiving the visual representation of the out-of-band token includes receiving the visual representation of the out-of-band token from an image detector, where receiving the visual representation of the out-of-band token from the image detector includes determining optical values at selected locations in the out-of-band token;
   determining, by the media content player, media content access rights to the particular media content from the visual representation of the out-of-band token that specifies (i) the particular media content and (ii) media content access rights to the particular media content;
   determining, by the media content player, whether the media content access rights to the particular media content determined from the visual representation of the out-of-band token specify that access to the particular media content is permitted; and
   in response to determining that the media content access rights to the particular media content determined from the visual representation of the out-of-band token specify that access to the particular media content is permitted, enabling, by the media content player, access to the particular media content through the media player.

* * * * *